Patented June 28, 1927.

UNITED STATES PATENT OFFICE.

ALEX BROOKING DAVIS, OF CINCINNATI, OHIO, ASSIGNOR TO A. B. DICK COMPANY, OF CHICAGO, ILLINOIS, A CORPORATION OF ILLINOIS.

STENCIL SHEET.

No Drawing.     Application filed October 26, 1925. Serial No. 65,051.

My invention relates particularly to stencil sheets of coated or impregnated yoshino or similar fabric which are stencilized by pressure, as impact of type and the like thereon. The object of the invention is to produce a sheet of high efficiency which may be easily and inexpensively manufactured, which may readily be stencilized and which shall be stable and durable in use. To this end, I have found that highly beneficial results may be obtained from the employment of a coating substance or compound consisting largely of pectin, preferably of a good quality and of about 5% strength. Pectin occurs in many fruits and is the principle which causes the juices to jell due to its property of effecting the precipitation or gelatinization thereof in the presence of a suitable agent such as cane sugar. Chemically, it is regarded as an oxy derivative of the vegetable gums, all of which have approximately the same empirical formula and are closely related in structure. It is produced in large quantites from waste food products and is, therefore, of low cost. Moreover, it is obtainable in uniform quality and can readily be adapted for stencil use by employing therewith a suitable modifying agent to soften the mass which would result from the use of pure pectin alone, making it pliable and stencilizable as by the impact of type upon the sheet coated or impregnated with such modified substance. A suitable modifying agent is monoacetin, although, if desired, this may be replaced by glycerin or a mixture of glycerin with monoacetin, diacetin or triacetin. Also, I have found it desirable to incorporate in the coating material a germicide or disinfectant which will permanently prevent injury to the pectin by molds or bacteria. Phenol is suitable for this purpose, although it may, if desired, be replaced by thymol, beta-naphthol or other agent having the property necessary for the purpose.

My invention may be simply carried out by forming a bath of 400 gms. of commercial, 5%, solution of pectin, 100 c. c. of monoacetin and 2 gms. of phenol. Porous sheets, such as Japanese yoshino, may be floated on or drawn over the surface of this bath, the excess solution taken up by the sheets being removed and returned to the bath by drawing them over a straight edge or wire in manner well understood. The sheets so coated or impregnated may then be hung in the air for a suitable time to permit the evaporation of the major portion of the water therefrom when they will be ready for use, the coating being homogeneous, type-impressible, stable and of good strength. If desired to increase the resistance of the coating to water or other solvents (contained, for example, in the ink employed), this may be done by adding to the mixture a substance, such as metallic salts, proteins, soap and the like which will cause the mixture to dissolve more slowly in, or to repel, water. It has been found that this result can readily be accomplished by adding to the mixture a small quantity of gelatin dissolved in water, also a substance functioning to coagulate such gelatin in the coating mass. With the quantum of pectin solution and monoacetin above specified there may be added 5 gms. of gelatin dissolved in 10 c. c. of water. 1 gm. of aluminum sulphate and 1 gm. of potassium dichromate may now be dissolved in 5 c. c. of water and this solution stirred into the mass and 5 gms. of phenol added thereto, the whole being thoroughly agitated. On drawing and hanging the sheets as above directed, after a few hours time, the major part of the water having evaporated, the coating will be found to have set in and upon the porous base in a dense, homogeneous form, far more resistant to water than were pectin alone employed. Moreover, the sheets are tough and durable and capable of efficient operation throughout an extended period of time.

When employing soap, as above suggested, there may be added to the pectin solution and monoacetin 20 gms. of castor oil sodium soap and 2 gms. of phenol. To decrease the water-solubility of such a coating solution there may be added metallic salts, such as lead or aluminum salts, which will change a portion or all of the soap into a less soluble state in the presence of water.

There is no intention herein to restrict the invention to the use of acetins as a modifying agent, as other modifiers may readily be substituted therefor or added thereto. Also internal lubricating effects may be obtained by the addition of substances such as sulphonated oils, for example, sulphonated castor or Turkey red oil.

Instead of (or in addition to) adding to the coating solution a colloid such as gelatin, and coagulating the same, this invention comprehends coagulating the pectin itself. To this end I have found that by employing salts of chromic acid, particularly the bichromates, the pectin may be precipitated from solution and the resulting pectin-chrome compound is substantially water-insoluble and well adapted for the use contemplated herein. This part of my invention may be practiced in the following manner: To 400 gms. of high grade, 5%, commercial pectin are added 150 gms. of monoacetin in which there may have been dissolved ½ gm. of Victoria blue. There are then added 50 c. c. of water and then 6 c. c. of a 50% solution of sodium bichromate and finally, as a preservative, 2 gms. of phenol. The yoshino sheets may be drawn over this solution, at ordinary temperature and in usual manner and hung for a few hours for the evaporation of excess moisture. The finished sheets, having a truly coagulated pectin coating, are practically and substantially water-insoluble and lend themselves readily to the stencilizing and reproducing processes.

It will be apparent that I may, hereunder, produce a stencil coating solution employing both coagulated pectin and coagulated protein (as gelatin), the chromium (or other coagulant) coagulating both substances at the same time; also that, if desired, I may employ a coagulant other than chromium and may include a retardent of coagulation, as acetic acid or the like; also that I may add, if desired, internal lubricants, modifiers, insoluble pigments or dyes and the like.

What I claim is:—

1. A type-impressible stencil sheet comprising a porous base having a coating including pectin.
2. A type-impressible stencil sheet comprising a porous base having a coating including pectin and an acetin.
3. A type-impressible stencil sheet comprising a porous base having a coating including pectin, an acetin and a germicide.
4. A type-impressible stencil sheet comprising a porous base having a coating including pectin and a lubricant.
5. A type-impressible stencil sheet comprising a porous base having a coating including pectin and a metallic salt.
6. A type-impressible stencil sheet comprising a porous base having a coating including pectin, an acetin and a metallic salt.
7. A type-impressible stencil sheet comprising a porous base having a coating including pectin and a protein.
8. A type-impressible stencil sheet comprising a porous base having a coating including pectin and a coagulated protein.
9. A type-impressible stencil sheet comprising a porous base having a coating including pectin, an acetin and a coagulated protein.
10. A type-impressible stencil sheet comprising a porous base having a coating including pectin, an acetin, coagulated protein and a metallic salt.
11. As a new article of manufacture, coagulated pectin.
12. As a new article of manufacture, water insoluble pectin.
13. A type-impressible stencil sheet comprising a porous base having a coating including coagulated pectin.
14. A type-impressible stencil sheet comprising a porous base having a coating including coagulated pectin and a modifying agent.
15. A type-impressible stencil sheet comprising a porous base having a coating including coagulated pectin and an acetin.
16. A type-impressible stencil sheet comprising a porous base having a coating including coagulated pectin, a modifying agent and a metallic salt.
17. A type-impressible stencil sheet comprising a porous base having a coating including coagulated pectin and coagulated protein.
18. A type-impressible stencil sheet comprising a porous base having a coating including coagulated pectin, coagulated protein and a modifying agent.

This specification signed this 16th day of October, 1925.

ALEX BROOKING DAVIS.